United States Patent [19]

Wiser

[11] Patent Number: 4,508,177

[45] Date of Patent: Apr. 2, 1985

[54] SOIL PITTING AND DAMMING IMPLEMENT AND PROCESS

[76] Inventor: Thayne B. Wiser, 236 Hillview Dr., Richland, Wash. 99362

[21] Appl. No.: 489,803

[22] Filed: Apr. 29, 1983

[51] Int. Cl.³ .................... A01B 35/16; A01B 49/00; A01B 39/12
[52] U.S. Cl. .................... 172/177; 172/540
[58] Field of Search .............. 172/21, 22, 90, 540, 172/548, 451, 90, 549, 236, 177

[56] References Cited

U.S. PATENT DOCUMENTS

| | | | |
|---|---|---|---|
| 510,266 | 12/1893 | Keizer | 172/556 |
| 2,098,738 | 11/1937 | Campbell . | |
| 2,176,984 | 10/1939 | Adkinson | 172/548 |
| 2,187,262 | 1/1940 | Brown . | |
| 2,193,275 | 3/1940 | Elliott . | |
| 2,196,038 | 4/1940 | Silver . | |
| 2,233,331 | 2/1941 | Vratil . | |
| 2,236,832 | 4/1941 | Nielsen . | |
| 2,362,728 | 11/1944 | Smith | 172/90 X |
| 2,613,585 | 10/1952 | Calkins | 172/549 |
| 2,780,975 | 2/1957 | Gunning | 172/143 |
| 2,928,484 | 3/1960 | Blocker | 172/549 |
| 3,403,737 | 10/1968 | Byrd | 172/451 X |
| 4,019,755 | 4/1977 | Eisenhardt | 172/451 |
| 4,102,406 | 7/1978 | Orthman | 172/548 |
| 4,213,502 | 7/1980 | Gibson | 172/143 |

FOREIGN PATENT DOCUMENTS

| | | | |
|---|---|---|---|
| 520414 | 3/1931 | Fed. Rep. of Germany | 172/540 |
| 526573 | 6/1931 | Fed. Rep. of Germany | 172/177 |
| 724629 | 8/1942 | Fed. Rep. of Germany | 172/177 |
| 731935 | 2/1943 | Fed. Rep. of Germany | 172/177 |
| 60365 | 11/1957 | India | 172/540 |
| 37515 | 9/1914 | Sweden | 172/540 |

OTHER PUBLICATIONS

Advertisement—Milestone, Inc. Mar. 1982.

*Primary Examiner*—Richard J. Johnson
*Attorney, Agent, or Firm*—Wells, St. John & Roberts

[57] ABSTRACT

An implement and process for implanting successive reservoirs, each including a "pit" and an adjacent "dam" in the ground surface along row crops for the purpose of retaining water and avoiding water runoff. The implement includes several spider wheels having radial blades spaced along a common shaft. The wheels are fixed to the shaft for common rotation. Blades of each spider wheel are angularly staggered from blades on other spider wheels of the same shaft. Weight of the spider wheels and shaft may therefore be carried by a minimum number of ground engaging blades to maximize soil penetration and minimize individual spider wheel weight. The present process involves formation of a pit in the soil surface and deposition of soil directly adjacent to the pit by rotating a radial blade surface about an axis while simultaneously moving the axis horizontally along the ground.

11 Claims, 7 Drawing Figures

SOIL PITTING AND DAMMING IMPLEMENT AND PROCESS

FIELD OF THE INVENTION

The present invention relates to an implement and process for implanting of reservoirs along the ground surface for retaining irrigation and rain water against runoff between rows of crops.

BACKGROUND OF THE INVENTION

Various devices have been developed and used for producing "dams" or "dikes" at spaced intervals between crop rows to catch and retain water. These units have appropriately been named "dammers" or "dikers". They typically make use of rotating scraper blades pulled behind a tractor. A "dammer" typically makes use of blades mounted to a rotatable shaft pulled behind the tractor. The blade will scrape along the ground surface until a hill of soil builds up along the front blade surface. Then a tripping mechanism operates to allow the blade to rotate on the shaft, leaving the soil "dam" behind and lowering a successive blade into engagement with the ground to form the next "dam". Various tripping mechanisms and blade configurations have been developed for this purpose. Examples of various "dammers" or "dikers" are illustrated by the following United States patents:

U.S. Pat. No. 2,233,331 to Vratil,
U.S. Pat. No. 2,236,832 to Nielsen,
U.S. Pat. No. 2,780,975 to Gunning,
U.S. Pat. No. 4,213,502 to Gibson,
U.S. Pat. No. 2,098,738 to Campbell,
U.S. Pat. No. 2,187,262 to Brown,
U.S. Pat. No. 2,193,275 to Elliot,
U.S. Pat. No. 2,196,038 to Silver.

Of the above patents, all deal with implements wherein soil "dams" are formed in furrows behind a furrow forming plowshare or cultivator. The top of the "dam" is typically at or near the original ground surface elevation with the furrow situated between the "dams".

Another form of water retention implement is commonly referred to as a "pitter". A "pitter" differs from a "dammer" or "diker" in function but not in principal. A pitter makes use of an extremely heavy frame carrying freely rotatable wheels with angular pitter blades spaced about their peripheries. The wheels roll freely over the ground when the tool is pulled ahead by a tractor. The shear weight of the frame and wheels drives the blades into the ground to form "pits" at spaced intervals. Such a "pitter" is produced by Milestone, Inc., Blackfoot, Idaho. The Milestone pitter includes inclined blades that enter the ground nearly vertically and exit nearly horizontally to form deep, wide pits. Individual bladed wheels are pivoted on a tool bar so each wheel can pivot elevationally relative to the others on the tool bar. The weight of the individual wheel and pivot frames are relied upon to drive the blades into the ground surface. Overall weight of the tool is therefore necessarily high.

A common problem facing those who use dammers or pitters is the rough "washboard" ground surface they leave along the ground. This roughened surface is later encountered by harvesters. The constant bouncing of harvester equipment as it moves over the rough terrain, often causes breakage of equipment and resultant time consuming repairs. Repair at harvest time is especially undesirable due to the need for harvesting the crop before any spoilage or over-ripening can occur. This is especially true in row crops in which dammers and pitters are most appropriately used. Nonetheless, the above forms of implements do contribute to conservation of moisture and reduction of runoff.

It remains desirable, though, to minimize the complexity and weight of such units and, further, to improve the operation thereof by forming a combination of pits and dams that will more effectively retain water and resist runoff, while minimizing "washboarding" of the ground surface.

BRIEF DESCRIPTION OF THE DRAWINGS

A preferred form of the present invention is illustrated in the accompanying drawings in which.

DETAILED DESCRIPTION

In compliance with the constitutional purpose of the Patent Laws "to promote the progress of science and useful arts" (Article 1, Section 8), applicant submits the following disclosure of the invention.

Figure 1:
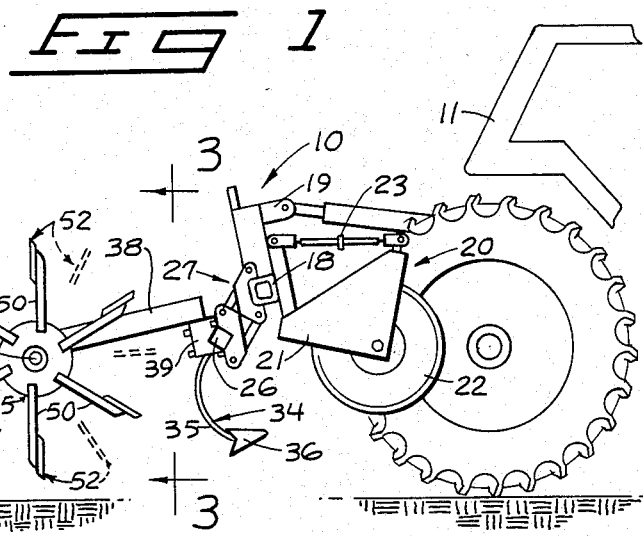
FIG. 1 is an end elevational view of the present implement mounted to a tractor and elevated to an inoperative position, showing one spider wheel in full lines and others behind in dashed lines.
Figure 5:
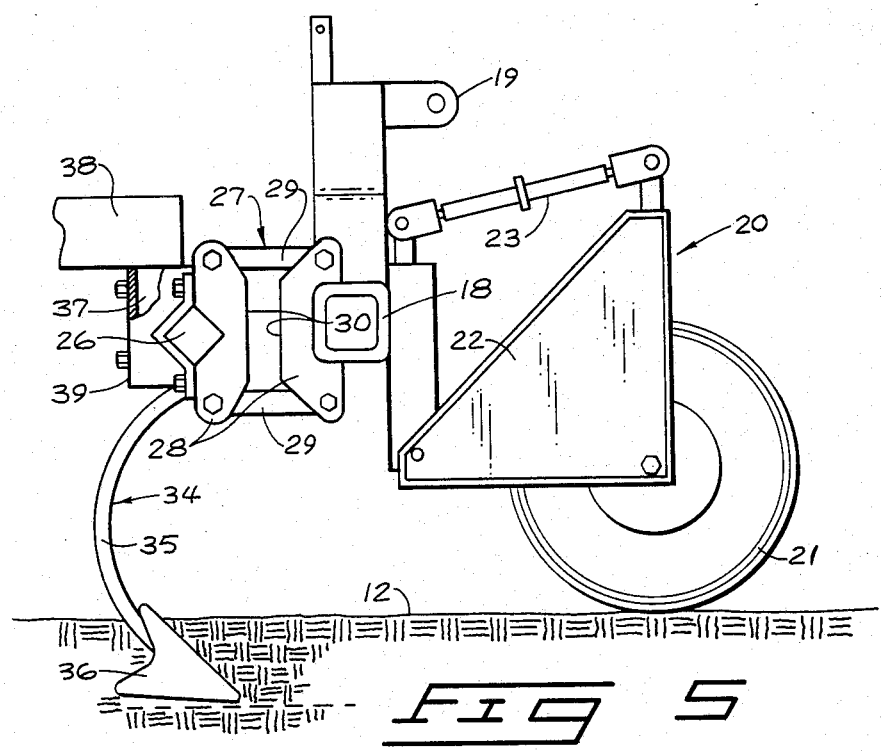
FIG. 5 is a fragmented enlarged side elevational view showing a cultivator and frame assembly of the present implement oriented in a ground-engaging, operative position.
Figure 6:
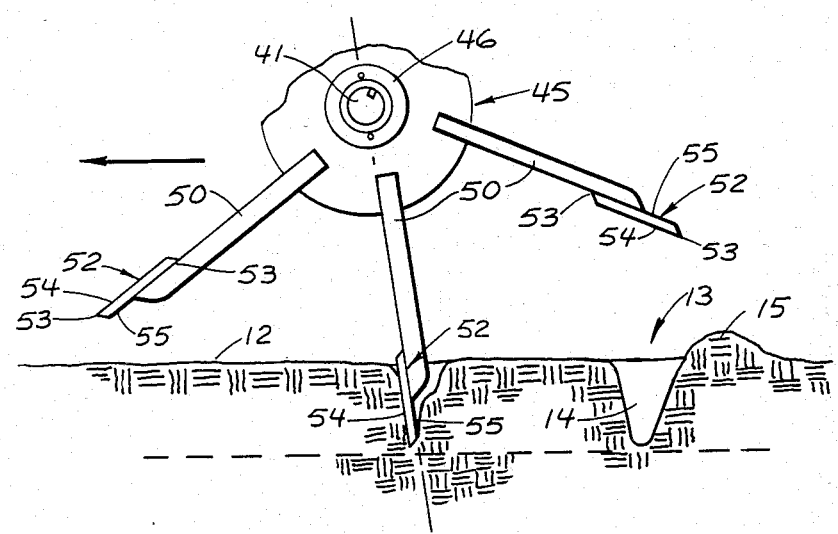
FIG. 6 is an enlaraged fragmentary view illustrating a single spider wheel in operation and diagrammatically illustrating the present process.
Figure 7:
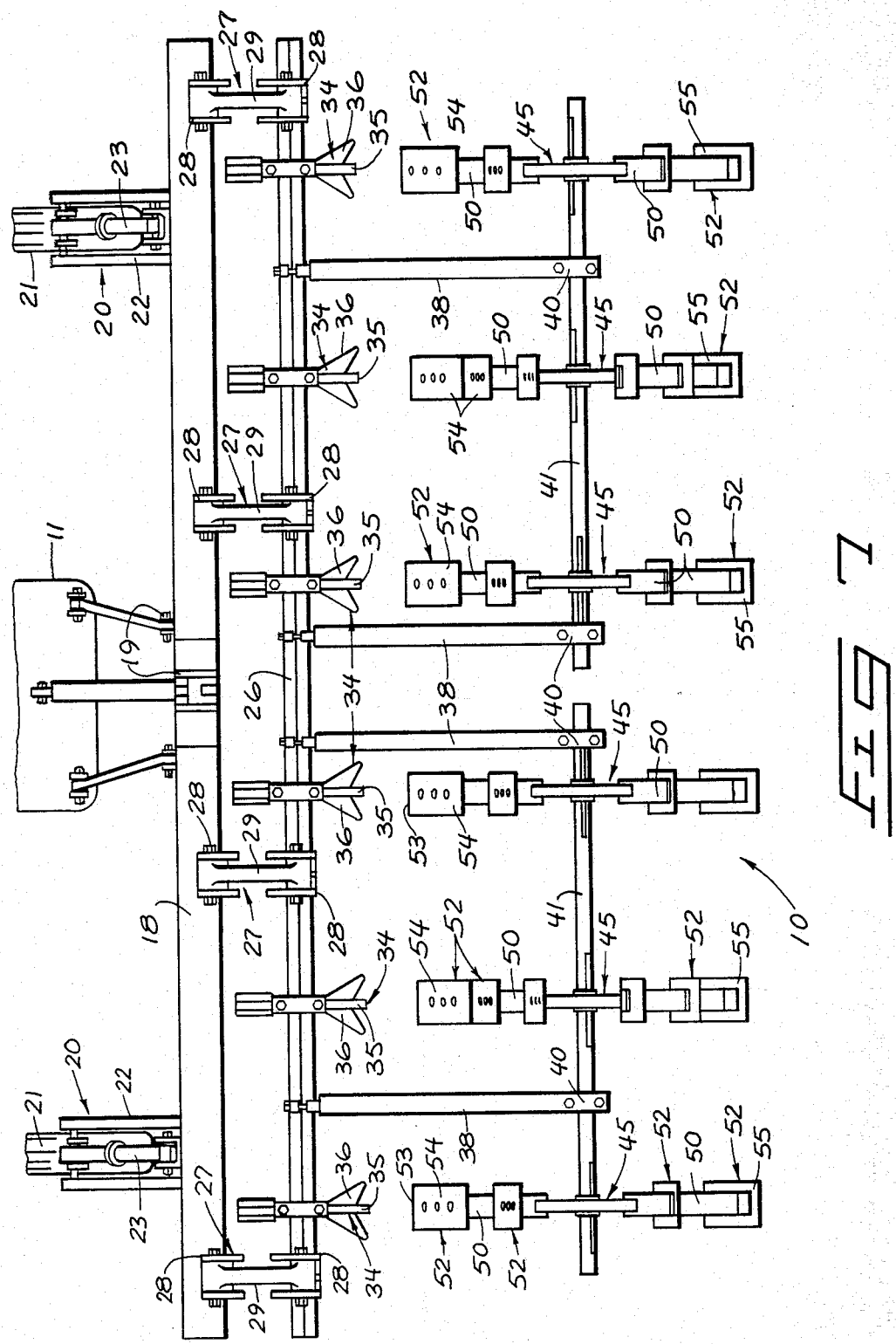
FIG. 7 is an enlarged plan view of the present implement.

FIGS. 1 and 7 generally illustrate an implement 10 embodying principals of the present invention. The implement 10 is adapted for connection to a standard farm tractor 11, to be pulled along the ground surface 12 behind the tractor. The tractor hydraulics and connecting mechanisms can be utilized to shift the implement from an above ground, inoperative carrying position as shown in FIG. 1 and a ground supported operative position as shown in FIGS. 5 and 6.

The present implement 10 is provided for the purpose of producing successions of implanted reservoirs 13 (FIG. 6) along the ground surface 12 between crop rows. Each implanted reservoir 13 includes a subsurface formed pit 14 and a slightly elevated built up area or dam 15 adjacent one side of the pit. This particular pit and dam configuration has been found to retain water and prevent runoff problems while presenting a minimal soil disturbance or "washboarding" effect that could later damage harvesting equipment.

The present implement 10 includes a primary transverse frame 18. The frame 18 is supplied with mounting mechanisms 19 for attachment to the tractor hitch assembly. The frame 18 is also supplied with depth gauging wheel means 20 for movably carrying the frame 18 at a prescribed elevation above the ground surface when the implement is lowered to its operative position.

The depth gauging wheel means 20 includes a pair of ground engaging tires 21 mounted by hinged frames 22 to the frame 18. An extendable shaft 23 extends between each hinged frame 22 and frame 18. Selective adjustment of the extendable shafts 23 will therefore selectively vary the operating elevation of the frame 18 when the tires 21 are positioned to roll along the ground surface.

A tool bar 26 is mounted to the frame 18 by a hinge link mechanism 27. The tool bar 26 is substantially parallel to the transverse frame 18 and is carried for free elevational movement (within limits) by the hinge link mechanism 27.

The hinge link mechanism 27 includes pairs of parallel arms 29 extending between brackets 28 on the respective tool bar 26 and frame 18. The parallel arms 29 are freely pivoted on the brackets 28 to allow pivotal motion of the tool bar 26 on the frame 18. Stop surfaces 30 on the opposing brackets 28 define prescribed limits of elevational movement for the tool bar 26 relative to frame 18. Thus, the brackets 28 will abut one another when the implement is carried above the ground surface as indicated in FIG. 1 and may separate as indicated in FIG. 5 when the implement is in an operative position. The depth gauging wheel means 20 can thus be adjusted to selectively vary the draft angle applied through the hinge link mechansisms 27 to the mechanisms carried on the tool bar 26. This "draft angle" will determine the operating depth at which the trailing tools function.

A number of cultivators 34 may be mounted to the tool bar 26. The cultivators 34 are spaced along the tool bar by distances equaling spacing between selected crop rows. The spacing can be varied with the crop row spacing simply by adjusting the cultivators appropriately along the length of the tool bar.

The cultivators 34 may include spring shanks 35 leading downwardly to sweep blades 36. The specific configuration of the shanks and blades may vary but preferably is sufficient to cultivate an approprate span of soil between the crop rows. Operating depth of the blades 36, as discussed above, is determined by adjustment of the depth gauging wheel means 20 to properly set the draft angle.

Rearwardly extending arms 38 are attached to the tool bar 26. Sockets 39 are affixed to the tool bar to receive downwardly projecting flanges 37 on the inward arm ends. Appropriate clamp bolts will hold the flanges firmly in place within the socket to allow elevational adjustment of the arms 38. Otherwise they are rigidly mounted to the tool bar for movement therewith. Adjustment of the mounting arms 38 may be made necessary only when different cultivators are to be mounted on the tool bar.

Arms 38 extend rearwardly to ends carrying bearings 40. These bearings 40 rotatably journal shafts 41 for free rotation about horizontal transverse axes. The shafts 41 are coaxial and with their axes parallel to the tool bar 26.

Figure 2:
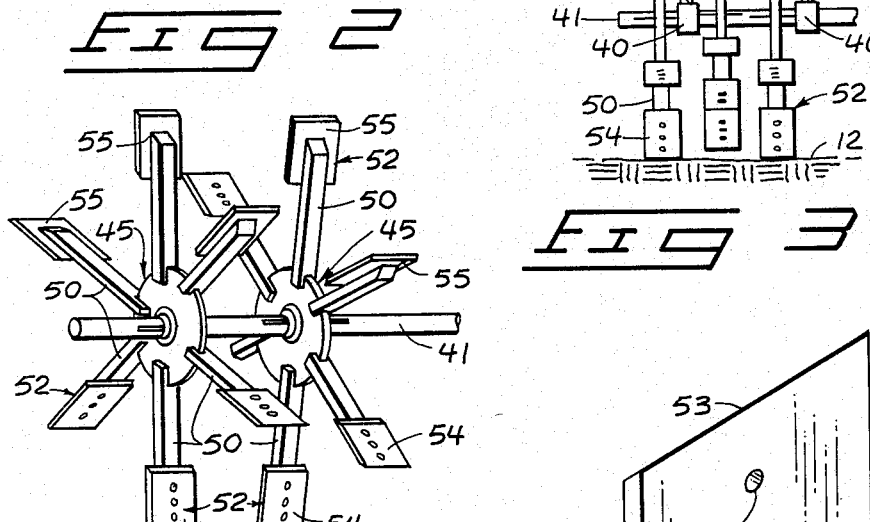
FIG. 2 is a fragmentary pictorial view illustrating two spider wheels of the present implement.
Figure 3:
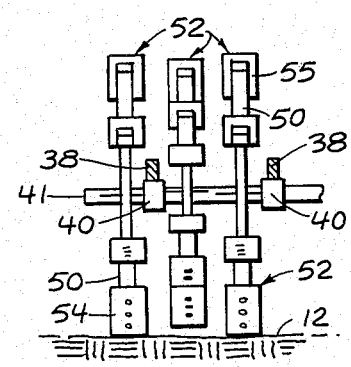
FIG. 3 is a diagrammatic view illustrating positioning of ground engaging blades of the present implement on a common mounting shaft.

A number of spider wheels 45 are mounted to each shaft 41 for rotation therewith. Individual spider wheels 45 are mounted through an adjustment means 46 on a shaft 41 to secure the spider wheel against rotation relative to the shaft and to allow axial adjustment of the spider along the shaft length. The adjustment means 46 can simply be comprised of appropriate key-ways formed within the shafts 41 and taper lock hubs on the spider wheels. Thus, the spider wheels 45 can be adjusted axially along the shaft in basically the same manner as the cultivator 34. FIG. 3 shows three spider wheels mounted closely together while FIGS. 2 and 7 show them spaced further apart.

Each spider wheel 45 includes a number of outwardly projecting arms 50. The arms 50 are equiangularly spaced about the spider wheels and extend to outer ends 51 spaced equally from the common shaft axis. A blade 52 is mounted to each arm end 51 for successive engagement along the ground. The spider wheel rotates in response to forward motion of the tractor 11.

The blades 52 are releasably mounted to the arms 50 to facilitate rotation to present one of two cutting edges 53 for engagement with the ground surface. Thus, a single blade 52 can be used twice before sharpening or replacement is required.

Figure 4:
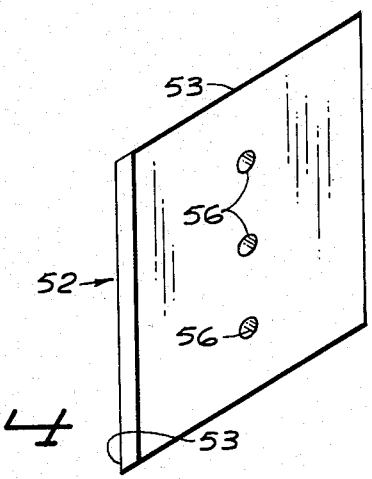
FIG. 4 is a pictorial view of a single blade for the present implement.

An individual blade 52 is indicated in FIG. 4. It includes the opposed cutting edges 53 at opposite ends and adjoining front and back face surfaces 54, 55. The blades 52 are mounted to arms 50 in such a manner that the back face 55 of each lies within a radial plane in relation to the axis of shaft 41. It is important to proper functioning of the present implement that the back surfaces 55 of blades 52 be radially oriented.

Each blade 52 is provided with a group of three mounting holes 56. Two of these mounting holes are used with bolt assemblies for securing the blade 52 to a spider arm 50. The holes are equally separated to enable reversal of the blade with either cutting edge 53 spaced a prescribed distance from the associated arm end 51.

The drawings indicate that each spider wheel 45 includes a set of six outwardly extending arms 50. However, as few as five arms may be utilized. Fewer would result in inefficient pit spacing and ground penetration. It is important that the arms be equiangularly spaced around the shaft axis and they extend to ends that are equidistant from the axis, for proper spacing of pits during operation and smooth overall operation.

The individual spider wheels 45 are also angularly offset from one another about the shaft axes in succession along the shafts 41. Also, as few as three spider wheels may be mounted to each shaft 41. These features are shown graphically in FIGS. 1 through 3 and 7. For example, the six blades of one spider wheel, spaced 60° from one another, as shown in FIGS. 1, 3, and 7, may be angularly spaced 30° from the blades of the next successive wheel. By this arrangement, only alternate blades will engage the ground surface at any given time. In FIG. 3, for example, two blades 52 are positioned in engagement with the ground surface while the intermediate blade of the remaining two spider wheel is suspended above ground on the shaft 41. Weight of the suspended spider wheels 45 and shaft 41 will thus be carried by the blades 52 engaging the ground. This feature is very important to the effective use of the present implement while minimizing its overall weight. As successive blades rotate into engagement with the ground surface, the weight of the remaining blades and shaft will shift to be borne by that particular ground engaging blades, thereby maximizing the amount of weight applied to the ground engaging blades as they rotate in unison with the shaft 41. As the wheels roll along the ground surface, one blade after another will engage the ground and penetrate due to the weight applied to it by the wheels, blades and shaft that are carried above the ground.

Ground penetration is assisted by the cultivators 34 which soften the ground directly ahead of the blades 52 and hold the wheels 45 down according to the operating depth of the blade sweeps 36. The blade depth of the cultivators, as noted earlier, is determined by the draft angle through hinge links 27, which, in turn, is set by the depth gauging wheels 20. The tendency is for the cultivator blades 36 to remain at the selected depth. They will therefore press downwardly through the mounting arms 38 against the shafts 41 to augment the weight of the several spider wheels 45 and shafts 41. The mounting arms 38 are positioned to set the shaft axes in relation to the cultivator blades 36 so the depth of penetration for the spider wheel blades 52 is approximately equal to the operating depth of the cultivator blades 36. This depth is indicated in FIGS. 5 and 6 by a dashed line. Elevational adjustment of the shaft axis may be accomplished at the mounting point between the arms 38 and tool bar 26.

Operation

Operation of the present implement and the steps involved with the present process may now be easily understood from the foregoing technical description.

Successive implanted reservoirs composed of combined pits and dams 14, 15 are formed along the ground surface as the present implement 10 is pulled along by the tractor 11. The successive pits 14 and dams 15 are formed as the spider wheels 45 rotate with the shaft 41 due to moving engagement of the blades 52 along the ground surface.

Implanting of a single reservoir including a pit 14 and dam 15 may best be understood with reference to FIG. 6. As the implement is pulled along, the cultivators 34 loosen the ground surface to a depth equal to the penetration depth of the blade sweeps 36. This loosened soil is in alignment with the spider wheels 45 being pulled along behind.

It is emphasized that rotation of the spider wheels and shaft is accomplished only by frictional engagement with the ground surface by the blades 52. This rotation is free and unrestricted so there is no "scraping" of soil along the ground surface to produce elevated dams by known forms of "dammers". It is the particular orientation of the blades with respect to the shaft axis and the free rolling motion of the wheels along the ground surface that "implants" the combined pits and dams described in detail below.

As an operative cutting edge 53 of a blade 52 engages the ground surface, the corresponding front face 54 of the blade is facing angularly upward and the parallel back face is oriented angularly downward. Continued forward motion of the wheel and rotation of the blade about the shaft axis causes the blade edge to engage the soil surface and penetrate downwardly. Simultaneously, during downward penetration by the blade edge 53, the surfaces 54 and 55 change angularly due to the forward motion of the shaft axis about which the blade rotates.

The blade faces 54 and 55 will progressively change angularly from the beginning orientation as the blade edge engages the ground surface to a substantially vertical orientation as the blade reaches full penetration to the full operating depth. This motion produces the initial configuration of the pit 14 in a wedge configuration.

The front face 54 of the blade, pivoting from the upwardly facing orientation to the upright orientation, compacts soil ahead of the blade. This compacting movement continues with rotation of the blade about the shaft axis and with continued forward motion of the shaft axis due to forward motion of the tractor. A fairly compacted pit wall is therefore formed along the front surface of the pit by the angular motion of the front blade face 54.

The dam 15 is formed by operation of the radial back blade face 55 as it is lifted from the soil surface following formation of the pit 14. As the blade continues its rotational motion and as the wheel continues moving forwardly, the radial back face 55 of the blade shifts angularly from the upright position at full ground penetration toward an upwardly facing angular orientation. Also, during this time, the blade is lifted upwardly. Through this motion, a small amount of soil is pushed up and rearwardly from within the pit. A part of this engaged soil is carried on the back blade face 55 and is deposited or dropped from the blade face onto the ground surface adjacent the pit forming the dam 15 as the blade continues its upward motion. This upwardly lifted soil dam 15 is not compacted but loosely lies on the ground surface directly adjacent to the pit 14.

The above operation of the present tool presents a pit 14 having a compacted front side surface and in the form of a narrow wedge with the loosely piled soil dam 15 adjacent a side opposite the compacted pit side to form the dam 15. The resulting implanted reservoir serves well to maintain water and to prevent run-off.

Overall depth from the peak of the individual dams 15 to the base of the wedge-shaped pits 14 may be comparable to the height of dams formed by dammers or pits formed by pitters. The distinction, however, is that the dam 15 is substantially smaller than the dams produced by previous "dammers" and the pit 14 may be substantially shallower and narrower than the pits formed by previous "pitters". The combination of the two dimensions combine to produce the unique implanted reservoir having an overall dimension comparable to both dammers and pitters.

A distinct advantage realized from the pit and dam reservoir configuration formed using the present implement and process is realized at harvest time. The small loose dams 15 are easily flattened by harvester wheels and the pits 14 are sufficiently narrow to be spanned by the harvester wheels. The harvester may move along smoothly over the ground surface, safely completing the harvesting operations without fear of breakdown due to excessive bouncing and jostling from "washboarding" effects experienced through the use of previous pitters and dammers.

Various distinct advantages have been realized through experimental use of the present implement and process in association with farm land treated by center pivot irrigators. Reservoirs formed by the pits 14 held for a complete growing season, even on steep slopes. Relatively flat areas spanned by the pitted irrigators in sandy soil yielded more crop of higher quality than in noted previous years. The minimal required weight for the present implement also proved advantageous in field operation by allowing operational speeds of approximately seven miles per hour. Such operational speed is significantly higher than any previously attainable, especially by previous forms of "dammers" that rely on scraping the soil into successive mounds.

Further advantages have been realized in operation and maintenance of the present implement. The lightweight nature of the implement decreases the amount of maintenance required in comparison with heavier "pitters". Furthermore, the light weight of the implement and reversibility of the blades significantly extend the blade life.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A tractor drawn soil pitting and damming implement, comprising:
   a frame adapted for attachment behind a tractor in transverse orientation thereto:
   a series of cultivator shanks transversely spaced along the frame;
   a shaft mounted to the frame behind the cultivator shanks for free rotation about a transverse axis in relation to the tractor;
   spider wheels affixed to the shaft for rotation therewith behind and substantially aligned with the cultivator shanks, having arms extending substantially radially outward to ends;
   individual blades mounted to each of the spider wheel arm ends for successive engagement along the ground as the spider wheels rotate in response to motion of the tractor;
   wherein the arms of the spider wheel are equiangularly spaced to position the blades angularly apart such that each blade may engage and penetrate the ground behind a cultivator shank to form a series of longitudinally spaced pits therein in response to forward motion of the tractor;
   wherein each blade includes a ground penetrating cutting edge and parallel planar front and back faces, the back face lying in a radial plane passing through the transverse axis to lift and deposit soil rearward of the pits, forming mounds of soil directly behind the pits;
   wherein the spider wheels are angularly offset from one another about the shaft axis in succession along the shaft such that the shaft will transfer maximum weight of the spider wheels, shaft and blades carried above the ground surface to a minimum number of blades engaging the ground surface at any given time.

2. The tractor drawn soil pitting and damming implement as claimed by claim 1 wherein the blades include straight cutting edges and planar faces that are radial in relation to the transverse axis.

3. The tractor drawn soil pitting and damming implement as claimed by claim 1 wherein the blades each include parallel opposed cutting edges removably mounted to a spider wheel arm such that either cutting edge thereof can be positioned to extend beyond the arm end to an operative position.

4. The tractor drawn soil pitting and damming implement as claimed by claim 1 wherein there are a minimum of five arms for each spider wheel and a blade for each arm.

5. The tractor drawn soil pitting and damming implement as claimed by claim 4 wherein there are a minimum of three spider wheels on the shaft.

6. The tractor drawn soil pitting and damming implement as claimed by claim 1 further comprising:
   a tool bar mounting the cultivator shank and the shaft; and
   hinge link means mounting the tool bar to the frame for free elevational movement between prescribed limits.

7. The tractor drawn soil pitting and damming implement as claimed by claim 6 further comprising:
   depth gauging wheel means mounted to the frame for rolling support of the frame at a prescribed elevation.

8. The tractor drawn soil pitting and damming implement as claimed by claim 1 wherein the cultivator shank includes a cultivator blade; and
   wherein the blades of the spider wheel and the cultivator blade are situated at the same approximate elevation in relation to the ground surface.

9. The tractor drawn soil pitting and damming implement as claimed by claim 8 wherein the cultivator blade is a sweep type cultivator blade.

10. The tractor drawn soil pitting and damming implement as claimed by claim 1 wherein a minimum of three spider wheels are mounted to the shaft and further comprising:
    adjustment means mounting the spider wheels to the shaft for axial adjustment relative to one another along the shaft.

11. A process for implanting a series of longitudinally spaced reservoirs including formed pits and rearwardly adjacent reservoir mounds of soil along the ground surface behind a forwardly moving tractor comprising the steps of:
    loosening the soil along a path behind the tractor;
    rotating a series of wheels each provided with a plurality of blades each having planar front and rear surfaces extending radially outwardly from and spaced equiangularly about a transverse shaft in response to forward motion of the tractor, such that the blades move in a circular path intersecting the ground surface;
    forcing an edge of each successive blade moving in the circular path into the ground to form a pit while simultaneously pivoting the blade to compact soil at a front surface of the pit;
    lifting the blades successively from the ground while moving in the circular path and lifting soil from below the ground surface and depositing the lifted soil on the ground surface directly behind the pits to produce individual mounds of soil on the ground surface rearwardly adjacent the pits.

* * * * *